Sept. 7, 1965   J. H. BENT ETAL   3,204,731
POSITIVE ENGAGING JAW CLUTCH OR BRAKE
Filed May 26, 1961   2 Sheets-Sheet 1
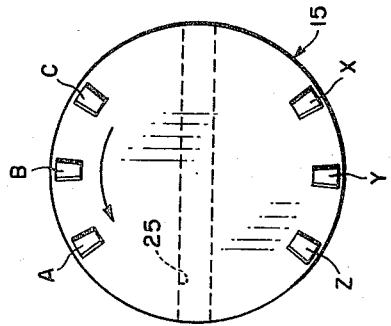
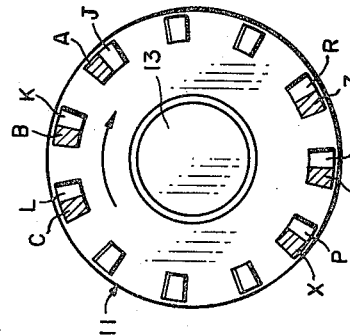
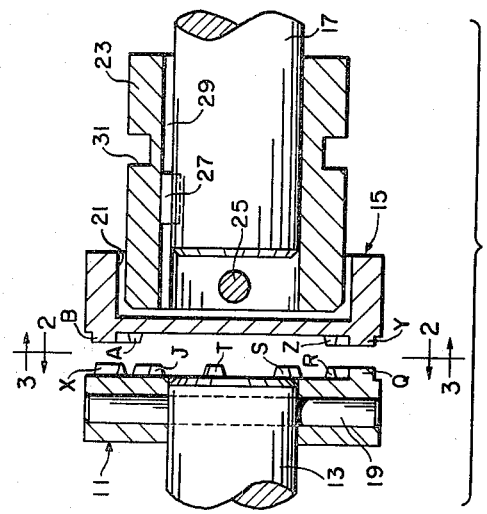
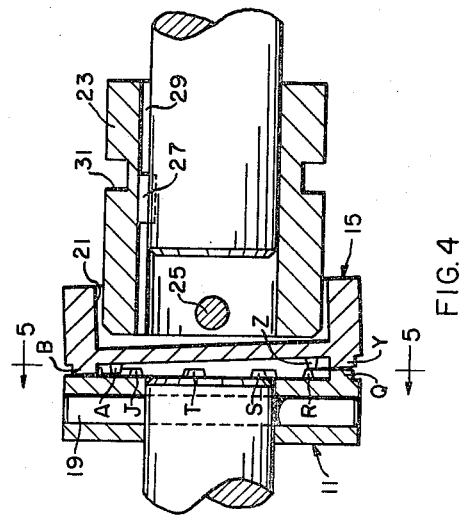
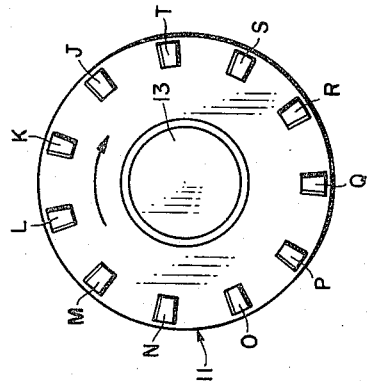
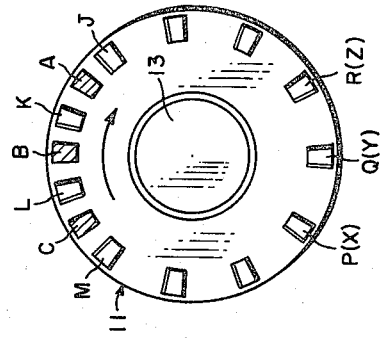
JOHN H. BENT
RICHARD H. OLSSON
INVENTORS
BY *Peter J. Murphy*
ATTORNEY

JOHN H. BENT
RICHARD H. OLSSON
INVENTORS

ATTORNEY

United States Patent Office 3,204,731
Patented Sept. 7, 1965

3,204,731
POSITIVE ENGAGING JAW CLUTCH
OR BRAKE
John H. Bent, Fullerton, and Richard H. Olsson, La Puente, Calif., assignors to Gardner-Denver Company, a corporation of Delaware
Filed May 26, 1961, Ser. No. 112,947
16 Claims. (Cl. 192—67)

This invention relates to a jaw clutch or brake providing for positive engagement of the jaw members, and more particularly to a jaw clutch or brake in which at least a portion of the mating teeth interengage immediately for positive action when the jaw members are engaged.

In jaw clutches of conventional design, a pair of clutch members, movable axially relative to each other, are provided with opposing clutch faces having complementary jaws or teeth for interengagement. The teeth of the clutch members are so spaced that when the clutch is engaged, through axial movement of at least one of the members toward the other, the crests of the teeth may initially engage each other preventing immediate interengagement of the teeth and may effect ratcheting between the clutch members prior to positive engagement.

In some applications for clutches of this type, it is necessary that the clutch engage positively and instantaneously when the clutch is actuated; that is, that the clutch teeth interengage positively and with substantially no time delay. Accordingly, a primary object of this invention is to provide a jaw clutch or brake in which a portion, at least, of the teeth of the engaging jaw members will immediately interengage for positive clutching, regardless of the relative rotational positions of the jaw members, at the moment of engagement.

The novel features of the invention, as well as additional objects and advantages thereof, will be understood more fully from the following description when read in connection with the accompanying drawings in which:

FIGURE 1 is a longitudinal sectional view of a clutch assembly according to the present invention;

FIGURE 2 is a face view of one of the clutch members of FIGURE 1, looking from the line 2—2 in the direction of the appended arrows;

FIGURE 3 is a face view of the other clutch member of FIGURE 1, looking from the line 3—3 in the direction of the appended arrows;

FIGURE 4 is a view similar to FIGURE 1, showing the clutch members partially engaged;

FIGURE 5 is a view similar to FIGURE 2, taken along the line 5—5 of FIGURE 4, showing partial engagement of the clutch teeth;

FIGURE 6 is a view similar to FIGURE 5 showing full engagement of the clutch teeth;

Figure 7:
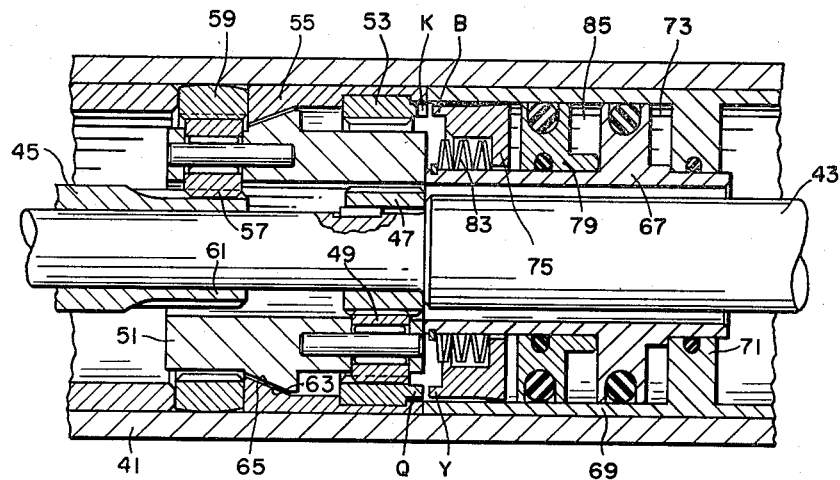
FIGURE 7 is a longitudinal sectional view of a brake assembly according to the invention.

A preferred embodiment of the invention is shown in FIGURES 1 through 6 of the accompanying drawing. The clutch assembly shown in these figures includes a driven clutch member 11 which is rigidly fixed to a driven shaft 13. A driving clutch member 15 is driven by a driving shaft 17 and is mounted on the shaft for axial movement and for limited pivotal movement relative to the shaft. The driving clutch member is movable into and out of engagement with the driven clutch member, and the limited pivotal movement of the driving member provides for instantaneous positive engagement of the clutch as will be seen.

The driven clutch member 11 is a disc-like member which is provided with an axial bore for receiving the end of the driven shaft 13, and is secured to the shaft by a transverse pin 19 which passes through the member and the shaft to prevent rotation and axial movement of the clutch member relative to the shaft. The driven clutch member is provided with an axially facing clutch face having eleven equally spaced clutch teeth J through T, in an annular arrangement adjacent to the periphery of the clutch face. The clutch teeth are identical in size and configuration and the angular spacing between the teeth is at least twice the angular width of each tooth.

The driving clutch member 15 is a cup-shaped member defining a recess 21 for receiving one end of a sleeve 23. The driving clutch member is pivotally secured to the sleeve by means of a transverse pin 25 passing through the driving member and the sleeve on an axis perpendicular to the axis of rotation of the sleeve and clutch member. The recess 21 is larger than the exterior diameter of the sleeve 23 to permit limited pivotal movement of the clutch member with respect to the sleeve. The sleeve is mounted over the end of driving shaft 17 and is rotationally driven by the shaft by means of a key 27, secured in the shaft, and a longitudinal internal key slot 29 in the sleeve. The sleeve is provided with an external annular groove 31 by means of which the sleeve and clutch member 15 may be moved axially relative to the driving shaft 17, by means of a yoke mechanism, for example (not shown).

The driving clutch member 15 is also provided with an axially facing clutch face which is provided with two sets of clutch teeth disposed on opposite sides of the pivot axis defined by the pin 25. One set of clutch teeth consists of three teeth A, B and C and the other set of driving teeth consists of three teeth X, Y and Z. The teeth of the driving clutch member are of the same size and configuration as the teeth of the driven clutch member, and the spacing of the teeth, within each set, is identical to the spacing of the teeth of the driven clutch member. However, one set of teeth of the driving clutch member is rotationally or angularly displaced with respect to the other set of teeth so that all of the teeth of the driving clutch member are not axially aligned with corresponding teeth of the driven clutch member at the same time. This will be seen from the following description of the clutch operation.

The described clutch will function identically for either direction of rotation; however, for the purpose of description, it is assumed that the direction of rotation of the driving clutch member is as indicated by the arrow in FIG. 3, and the direction of rotation for the driven clutch member after engagement of the clutch is as indicated by the arrows in FIGS. 2, 5 and 6. In FIG. 1, the clutch is shown in disengaged condition, and it is assumed that the driving clutch member is rotating and that the driven clutch member is not rotating.

To engage the clutch, the sleeve 23 and driving clutch member 15 are moved axially toward the driven clutch member. FIGS. 4 and 5 illustrate the positions of the clutch members at the moment of engagement and further illustrate one possible condition of the relative rotational positions of the teeth of the driving and driven clutch members. In this illustrated condition, teeth X, Y and Z of the driving member axially coincide with the teeth P, Q and R of the driven member. When these teeth first engage each other, the driving clutch member pivots so that the teeth A, B and C of the driving member fall between the teeth J, K, L and M of the driven member respectively. This provides for substantially instantaneous interengagement of the teeth A, B and C and the teeth J, K, L and M. In FIG. 5, the teeth of the driving member are not yet in driving engagement with the teeth of the driven member. In FIG. 6, the driving member is shown as being rotated an additional small amount with respect to the driven member, and the teeth A, B and C have moved against the teeth J, K and L in driving engagement. The teeth X, Y and Z have moved off the teeth P, Q and R and now lie ahead of the latter teeth, relative to the direction of rotation. The clutch is now fully engaged and the driving clutch member lies in a plane perpendicular to the axis of rotation.

The driving of the driven member is accomplished, in the indicated direction of rotation, only by the driving teeth A, B and C and the driven teeth J, K and L. Teeth X, Y and Z provide no driving function because they lie ahead of teeth P, Q and R. It will be seen, however that the engagement of teeth X, Y and Z with the teeth P, Q and R prevents forward rotation of the driven clutch member relative to the driving clutch member. Also, it will be seen that if the teeth had assumed the same relative positions while driving in the opposite direction, the teeth X, Y and Z would be in driving engagement with teeth P, Q and R.

It is possible that, at the moment of clutch engagement, the teeth would be in the relative positions shown in FIG. 6. In this event, there would be no pivoting of the driving clutch member and the driving engagement would be instantaneous. In the condition shown in FIGS. 4 and 5, there would be a very slight lag in driving engagement to take up the slack between the positions of the teeth shown in FIGS. 5 and 6. Regardless of the relative rotational positions of the driving clutch member and the driven clutch member, at least one set of the driving teeth will be interengaged with the teeth of the driven member substantially at the moment of engagement. Accordingly, it is impossible for crests of all of the driving teeth to simultaneously engage the crests of the driven teeth, which condition results in delay of clutch engagement and ratcheting of the clutch teeth.

While in the described embodiment, the driving clutch member is provided with two sets of three driving teeth, it will be apparent that more or less teeth may be provided depending on the size of the clutch members and the amount of torque which the clutch must transmit.

Figure 8:
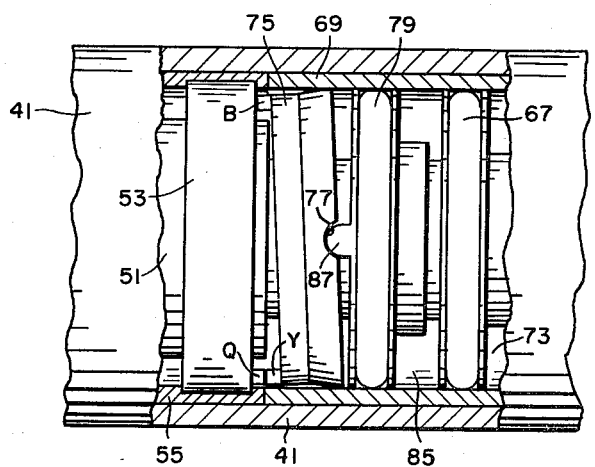
FIGURE 8 is a view of the brake assembly of FIGURE 7, partially broken away, showing the brake partially engaged.

FIGS. 7 and 8 illustrate a brake assembly according to the invention. These figures show a portion of a tool assembly, for example, enclosed within a cylindrical housing 41 and having a driving shaft 43 extending through the portion of the assembly shown. A hollow driven shaft 45 is mounted over the driving shaft, and is driven by the driving shaft through a planetary gear mechanism and a brake assembly to be described.

A pinion 47 is keyed for rotation with the driving shaft 43 and meshes with planet gears 49 rotatably carried in a rotatably mounted cage 51. The planet gears 49, in turn, mesh with a ring gear 53 which is mounted for rotation within a bushing sleeve 55, nonrotatably mounted in housing 41. The cage 51 also carries planet gears 57, which are rotatably mounted therein and are axially spaced from the planet gears 49. The idler gears 57 mesh with a ring gear 59, which is nonrotatably fixed in the housing 41, and a gear 61, which is integral with the driven shaft 45. In the above described assembly, the driving shaft 43 is rotated at a fixed speed and the purpose of the planetary mechanism and the brake assembly is to drive the driven shaft 45 faster than the driving shaft 43 or to stop rotation of the driven shaft. In order to accomplish this, piston actuated brakes are provided for alternatively stopping rotation of the cage 51 and of the rotatable ring gear 53.

The cage 51 is mounted for limited axial movement and is provided with a cone surface 63 positioned for frictional engagement with a complementary cone surface 65 in the bushing sleeve 55. An annular piston 67 is defined by a sleeve-like member, having a radial flange, which surrounds a portion of the driving shaft. A housing sleeve 69, having an integral baffle 71, defines a chamber within which the piston is mounted; and the piston and housing sleeve define an annular chamber 73 into which pressurized air may be admitted. When air is admitted to this chamber, the piston is urged toward the left, in FIG. 7, in turn moving the cage to the left to frictionally engage the cone surfaces and prevent rotation of the cage.

The rotatable ring gear 53 is provided with axially facing teeth, which have the same configuration and arrangement as the teeth for the driven clutch member 11 of the first described embodiment, and defines one brake member in the present embodiment. In FIG. 7, for the purpose of clarity, only teeth K and Q of the ring gear are shown. A brake member 75 is defined by an annular member disposed between the piston 67 and the housing sleeve 69 and is provided with axially facing teeth opposing the teeth of the rotatable ring gear 53. The teeth of the brake member 75 have the same configuration and arrangement as the teeth for the driving clutch member 15 of the first described embodiment. For the purpose of clarity, only the teeth B and Y are shown. The brake member 75 is mounted for axial and rocking movement between the above described members, and is fixed against rotation relative to the housing 41. As best shown in FIG. 8, one face of the brake member 75 is provided with a transverse groove 77, of arcuate cross section.

A second annular piston 79 is mounted between the first mentioned piston 67 and the housing sleeve 69, adjacent to the brake member 75. The pistons 67 and 79 are sealed with respect to each other and with respect to the housing sleeve 69 by means of suitable O-rings. As best shown in FIG. 8, the piston 79 is provided with a transverse rib 87 having an arcuate crest which is received within the groove 77 of the brake member 75. The rib 87 and groove 77 define a transverse pivot axis, for the brake member 75, which intersects the axis of rotation of the rotating parts of the brake assembly. A spring 83, consisting of a plurality of spring washers, biases the brake member 75 and the piston 79 rearward against the flange of the piston 67. Hence, the brake member 75 is normally biased out of engagement with the ring gear 53, and brake engagement is effected by directing pressurized air to a chamber 85 defined by the two pistons and the housing sleeve 69.

In the operation of this assembly, it is assumed that the driving shaft 43 is rotated at a constant speed. In order to drive the driven shaft 45 faster than the driving shaft, pressurized air is directed to the chamber 85 acting against the piston 79, to move the brake member 75 into engagement with the rotatable ring gear 53, and acting against the piston 69 to permit rotation of the cage 51 by removing axial pressure therefrom. The brake engages in the manner described with reference to the first described embodiment and locks the ring gear against rotation. The drive ratio for the planetary mechanism provides for rotation of the driven shaft 45 faster than the driving shaft 43, when the rotatable ring gear 53 is locked against rotation. The chamber 73 is vented to atmosphere while pressurized air is directed to the chamber 85.

In order to stop rotation of the driven shaft 45, the chamber 85 is vented to atmosphere and pressurized air is directed to the chamber 73 acting against the piston 67 to move the cage 51 effecting engagement of the cone surfaces 63 and 65 to frictionally lock the cage. The brake member 75 is disengaged from the rotatable ring gear 53, by the spring 83, to permit rotation of the ring gear. Since the cage cannot rotate, the drive pinion 47 merely rotates the rotatable ring gear through the idler gears 49. The planet gears 57, which are meshing with the fixed ring gear 59, cannot rotate and hence the driven shaft 45 cannot rotate.

There have been described embodiments of a clutch and a brake according to the present invention. In the first described embodiment, the clutch assembly is associated with driving and driven shafts for the purpose of transmitting torque from a driving shaft to a driven shaft. In the second described embodiment, the brake has one member fixed against rotation and is selectively engaged with a rotatable brake member to prevent rotation thereof. In each embodiment, one of the clutch or brake members is pivotally mounted and is provided with a tooth arrangement such that, when the clutch or brake members are engaged, the teeth will interengage immediately regardless of the relative rotational positions of the engaging jaw members.

We claim as our invention the following:

1. A clutch or brake for relatively rotatable elements comprising:
   a pair of axially opposing jaw members having teeth for interengagement with each other; means for mounting one of said jaw members for axial movement, on a respective element, into and out of engagement with the other jaw member;
   means for mounting one of said jaw members for pivotal movement, on a respective element, about an axis transverse to the direction of said axial movement;
   and the teeth of said jaw members being arranged so that the teeth of said pivoted jaw member disposed on, at least, one side of said pivot axis interengage immediately with the teeth of the opposing jaw member when the jaw members are engaged.

2. The invention set forth in claim 1 wherein said one jaw member mounted for pivotal movement is the same one jaw member mounted for axial movement.

3. A clutch or brake for relatively rotatable elements comprising:
   a pair of axially opposing jaw members; means for mounting one of said jaw members for axial movement, on a respective element, into and out of engagement with the other jaw member; said jaw members having teeth disposed in an annular arrangement, relative to the axes of rotation, for interengagement with each other when the jaw members are engaged;
   means for mounting one of said jaw members for limited pivotal movement, on a respective element, about an axis transverse to the direction of said axial movement; the teeth of said pivoted jaw member consisting of two sets of teeth, disposed respectively on opposite sides of said pivot axis;
   and the teeth of said jaw members being arranged so that the teeth of one of said sets, at least, interengage immediately with the teeth of the opposing jaw member when the jaw members are engaged.

4. The invention set forth in claim 3 wherein said one jaw member mounted for pivotal movement is the same one jaw member mounted for axial movement.

5. A clutch for relatively rotatable elements comprising:
   a pair of axially opposing clutch members having clutch teeth for interengagement with each other; means for mounting one of said clutch members for axial movement, on a respective element, into and out of engagement with the other;
   means for mounting one of said clutch members for pivotal movement, on a respective element, about an axis transverse to the direction of said axial movement;
   and the teeth of said clutch members being arranged so that the teeth of said pivoted clutch member disposed on, at least, one side of said pivot axis interengage immediately with the teeth of the opposing clutch member when the clutch members are engaged.

6. The invention set forth in claim 5 wherein the teeth of said clutch members are arranged so that the crests of the teeth of said pivoted clutch member, on one side only of said pivot axis, may engage the crests of the teeth of the opposing clutch member.

7. The invention set forth in claim 5 wherein said one clutch member mounted for pivotal movement is the same one clutch member mounted for axial movement.

8. A clutch for relatively rotatable elements comprising:
   a pair of axially opposing clutch members; said clutch members having clutch teeth disposed in an annular arrangement, relative to the axes of rotation, for interengagement with each other when the clutch is engaged; means for mounting one of said members for axial movement, on a respective element, into and out of engagement with the other member;
   means for mounting one of said members for limited pivotal movement, on a respective element, about an axis transverse to the direction of said axial movement; the teeth of said pivoted member consisting of two sets of teeth disposed, respectively, on opposite sides of the pivot axis;
   and the teeth of said clutch members being arranged so that the teeth of one of said sets, at least, interengage immediately with the teeth of the opposing clutch member when the clutch is engaged.

9. The invention set forth in claim 8 wherein the teeth of said clutch members are arranged so that the crests of the teeth of only one of said sets may engage the crests of the teeth of the opposing clutch member.

10. The invention set forth in claim 8 wherein said one clutch member mounted for pivotal movement is the same one clutch member mounted for axial movement.

11. A clutch for relatively rotatable elements comprising:
   a pair of axially opposing clutch members; means for mounting one of said clutch members for axial movement, on a respective element, into and out of engagement with the other clutch member; said members being provided with peripherally spaced teeth for interengagement with each other when the clutch is engaged;
   means for mounting one of said clutch members for pivotal movement, on a respective element, about an axis transverse to the direction of said axial movement;
   said clutch member, opposing said pivoted member, having equally spaced teeth; said pivoted member having two sets of teeth disposed on opposite sides of said pivotal axis, the spacing of the teeth in each set corresponding to the spacing of the teeth of said opposing member;
   and one of said sets being rotationally displaced relative to the other of said sets to provide for positive interengagement of the teeth of at least one of said sets with the teeth of said opposing member when said clutch members are engaged, regardless of the relative rotational positions of said clutch members.

12. A clutch for relatively rotatable elements comprising:
   a pair of axially opposing clutch members; means for mounting one of said clutch members for axial movement, on a respective element, into and out of engagement with the other clutch member;
   means for mounting one of said clutch members for limited pivotal movement, on a respective element, about an axis perpendicular to the direction of said axial movement; the clutch member, opposing said pivoted member, defining a clutch face lying in a plane perpendicular to the direction of said axial movement;
   a plurality of equally spaced clutch teeth extending axially from said clutch face, of said opposing clutch member, disposed in an annular arrangement relative to the axis of rotation; said pivoted clutch member defining a clutch face having two sets of clutch teeth projecting outwardly therefrom and disposed, respectively, on opposite sides of the pivot axis; each of said sets being disposed opposite to the teeth of said opposing clutch member, and the teeth of each set being equally spaced to correspond to the spacing of the teeth of the said opposing clutch member;

and said sets being angularly arranged, relative to the teeth of the opposing clutch member, so that the teeth of at least one of said sets will interengage immediately with the teeth of said opposing clutch member in any relative angular position of said clutch members.

13. A clutch for relatively rotatable elements comprising:
a pair of axially opposing clutch members; means for mounting one of said clutch members for axial movement, on a respective element, into and out of engagement with the other clutch member; said clutch members having clutch teeth disposed in an annular arrangement, relative to the axes of rotation, for interengagement with each other when the clutch members are engaged;
means for mounting one of said clutch members for limited pivotal movement, on a respective element, about an axis transverse to the direction of said axial movement;
the teeth of the clutch member, opposing said pivoted member, being identical to each other and equally spaced, the angular distance between adjacent teeth being at least twice the angular width of one of said teeth; the teeth of said pivoted member consisting of two sets of teeth disposed, respectively, on opposite sides of the pivot axis; the teeth, in each of said sets, being identical in size, spacing and arrangement to the teeth of the opposing clutch member;
and one of said sets of teeth being angularly displaced relative to the other set so that the teeth of one of said sets, at least, interengage immediately with the teeth of said opposing clutch member, when the clutch members are engaged.

14. A brake for a rotatable element comprising:
first and second axially opposing brake members having teeth for interengagement with each other;
said first brake member being a part of a rotatable element and rotating with said element; means for mounting said second brake member for axial movement into and out of engagement with said first brake member; means for mounting said second brake member for pivotal movement, on said first named mounting means, about an axis transverse to the direction of said axial movement;
and the teeth of said brake members being arranged, relative to each other, so that the teeth of said pivoted brake member disposed on, at least one side of said pivot axis, interengage immediately with the teeth of the opposing brake member when the brake members are engaged.

15. A brake for a rotatable element comprising:
a first brake member, being a part of a rotatable element, having teeth disposed in an annular arrangement relative to the axis of rotation;
a second brake member; means for mounting said second brake member for axial movement into and out of engagement with said first brake member; means for mounting said second brake member for limited pivotal movement, on said first named mounting means, about an axis transverse to the direction of said axial movement; the teeth of said pivoted brake member consisting of two sets of teeth disposed, respectively, on opposite sides of the pivot axis;
and the teeth of said brake members being arranged so that the teeth of one of said sets, at least, interengage immediately with the teeth of the opposing brake member when the brake members are engaged.

16. A brake for a rotatable element comprising:
a first brake member being a part of a rotatable element and rotating with said element; said first brake member having annularly arranged, equally spaced teeth disposed in a plane perpendicular to the axis of rotation and extending axially therefrom;
a second brake member having teeth for interengagement with the teeth of said first brake member; means for mounting said second brake member for axial movement into and out of engagement with said first brake member; means for mounting said second brake member for limited pivotal movement, on said first named mounting means, about an axis transverse to the direction of said axial movement; the teeth of said second brake member being angularly arranged and extending axially therefrom, comprising two sets of teeth disposed, respectively, on opposite sides of said pivot axis, the teeth of each set being equally spaced to correspond to the spacing of the teeth of said first brake member;
and said sets being angularly arranged, relative to the teeth of said first brake member, so that the teeth of at least one of said sets will interengage immediately with the teeth of said first brake member in any relative angular position of said brake members.

References Cited by the Examiner

UNITED STATES PATENTS

| | | |
|---|---|---|
| 904,463 | 11/08 | Taylor. |
| 1,142,787 | 6/15 | Landsiedel _____ 192—67 X |
| 1,669,749 | 5/28 | Guild _____ 192—67 |
| 2,444,148 | 6/48 | Warwick _____ 192—67 X |

DAVID J. WILLIAMOWSKY, *Primary Examiner.*

THOMAS J. HICKEY, *Examiner.*